A. Carson,
Converting Motion.
Nº 9,131.          Patented July 20, 1852.
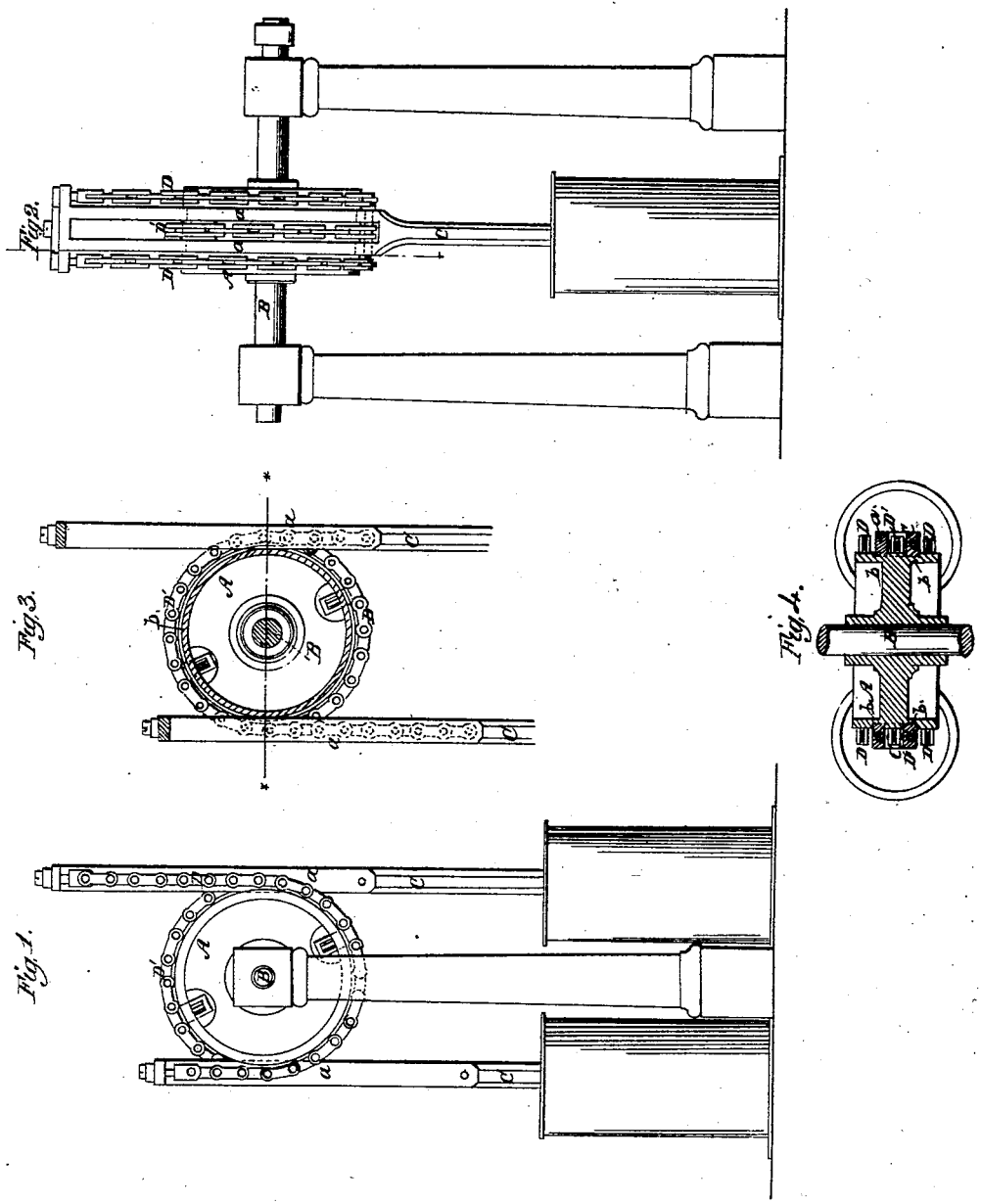

UNITED STATES PATENT OFFICE.

ALFRED CARSON, OF NEW YORK, N. Y.

METHOD OF CONVERTING RECIPROCATING ROTARY INTO RECIPROCATING RECTILINEAR MOTION.

Specification of Letters Patent No. 9,131, dated July 20, 1852.

*To all whom it may concern:*

Be it known that I, ALFRED CARSON, of the city, county, and State of New York, have invented a new and useful Improvement in Means of Converting Alternate or Reciprocating Circular Motion into Alternate or Reciprocating Rectilinear Motion, and vice versa; and I do hereby declare that the following is a full,clear, and exact description of the same, reference being had to the accompanying drawings, forming part of this specification, in which—

Figure 1, is a front elevation of two pumps of a fire engine having my improvements applied to their working gear. Fig. 2 is a side elevation of the same. Fig. 3 is a vertical section of the working gear in the line + + of Fig. 2. Fig. 4 is a horizontal section of the same in the line * * of Fig. 3.

Similar letters of reference indicate corresponding parts in each of the several figures.

Before proceeding to describe my improvement I will state that the means I employ for changing the motion are in a great measure similar to means in common use for working the pumps of fire engines, consisting in a pulley and chains, but these as commonly employed tend to drag the pump rods out of line.

My improvement is designed to obviate this difficulty, and to insure the perfect rectilinear motion of the rods without the interposition of connecting rods and guides or other devices to keep them in line, by causing the chains to pull upon them in the line of their motion; it will also in a great measure prevent their being thrown out of line by any accidental causes.

A, is the pulley, and B, its shaft, upon which it is firmly secured.

C, C, are the pump rods, which are forked or slotted at the part which is opposite the pulley; the two sides a, a, of the forked or slotted part fit in the grooves b, b, turned or otherwise formed around the periphery of the pulley (see Fig. 3, where the section is taken through the groove, and also Fig. 4).

Instead of two chains as commonly used I use three (3), viz., two (2) D, D, connected to the upper end of each pump rod outside the sides a, a, and passing under the pulley, and one (1) D', connected to each rod at the bottom of the slot or fork and working between the sides a, a, and passing over the pulley, all the chains being secured to the periphery of the pulley which is cylindrical except that it is grooved as already described to receive the edges of the sides a, a, of the fork or slotted part of the rods.

The points of connection of the chains with each rod are all in a plane parallel with the axis and passing through the center of the rods, the centers of the chains are all in the same plane; consequently the rod can have no tendency to work out of line toward or from the pulley. Each chain D', being in line with the center of the pump rod, and those D, D being at equal distances from it, the rod will have no tendency to work out of line sidewise.

The rods as commonly arranged are placed far enough away from the pulley to clear it in working, and the chains cannot then pull in a direct line with the center of the rod; two chains only are employed, one on each side of them which also prevents their pulling in a direct line; thus the rods are dragged out of line in every direction and the pump pistons and insides of the cylinders are caused to wear unevenly. This cannot take place when the rods are let into grooves in the pulley and slotted or forked and worked by three chains as I have described. The grooves b, b, in the barrel also serve as guides and are sufficient to keep the rods in line sidewise, and if of proper depth would prevent the rods being drawn toward the axis of the pulley that being the way in which they are most likely to be dragged, hence the grooves form an additional means of security for the proper operation of the rods. I will observe that it is possible to make the chains pull in line with the rods without grooving the pulley by making the chains very broad and the rods narrow, but that would be weakening the rods and giving the chains more than necessary strength.

I have described my invention as applied to working pumps, but there are many purposes to which it is applicable, both in the way I have shown it, and also with the motion reversed.

I do not claim the use of pulleys, chains, and guides for the purpose of converting rotary reciprocating into rectilinear reciprocating motion, but What I do claim as my invention and desire to secure by Letters Patent, is—

Slotting or forking the rods C, C, and letting their two sides $a, a$, into grooves $b, b$, in the periphery of the pulley, and connecting the rods and pulley by three (3) chains, two (2) D, D, of which connect with each rod on opposite sides and pass in one direction around the pulley, and the other D′, connects with each rod within the slot or fork and passes in the opposite direction around the pulley for the purpose of guiding and directing the rods and dispensing with the ways and cross heads ordinarily made use of for this purpose, the several parts operating substantially as and for the purpose set forth.

ALFRED CARSON.

Witnesses:
S. H. WALES,
R. MACFARLANE.